(12) United States Patent
Sokolov et al.

(10) Patent No.: US 7,596,169 B2
(45) Date of Patent: Sep. 29, 2009

(54) METHOD OF GEOMETRIC HARMONIC SIGNAL MODULATION

(75) Inventors: Yuri Borisovich Sokolov, Tsentralnaya (RU); Valery Viktorovic Saharov, Tropinina (RU)

(73) Assignee: DiS PLUS Ltd, Moscow (RU)

( * ) Notice: Subject to any disclaimer, the term of this patent is extended or adjusted under 35 U.S.C. 154(b) by 533 days.

(21) Appl. No.: 10/578,116

(22) PCT Filed: Oct. 7, 2004

(86) PCT No.: PCT/RU2004/000390

§ 371 (c)(1),
(2), (4) Date: May 1, 2006

(87) PCT Pub. No.: WO2005/043774

PCT Pub. Date: May 12, 2005

(65) Prior Publication Data

US 2007/0081600 A1     Apr. 12, 2007

(30) Foreign Application Priority Data

Oct. 31, 2003   (RU) .............................. 2003131978

(51) Int. Cl.
*H04B 1/69* (2006.01)
*H04B 1/707* (2006.01)
*H04B 1/713* (2006.01)

(52) U.S. Cl. ....................... 375/146; 375/130; 375/140; 375/131

(58) Field of Classification Search ................. 375/131, 375/146, 130, 132, 140, 135, 259
See application file for complete search history.

(56) References Cited

U.S. PATENT DOCUMENTS

| 5,844,949 A | 12/1998 | Hershey et al. ............. 375/346 |
| 6,023,488 A * | 2/2000 | White ......................... 375/146 |
| 6,329,905 B1 | 12/2001 | Cunningham .......... 340/310.01 |

FOREIGN PATENT DOCUMENTS

| RU | 2178952 C1 | 1/2002 |
| SU | 1241518 A1 | 6/1986 |

* cited by examiner

*Primary Examiner*—Phuong Phu
(74) *Attorney, Agent, or Firm*—Houston Eliseeva LLP

(57) ABSTRACT

The invention relates to electrical network communications engineering and can be used in systems for automatic data collection from intrusion protection and fire alarm sensors, electric, heat, water, gas meters and fiscal memory data devices for cash registers. The technical result is significant reduction of power consumption in transmitters of system slave units and/or expansion of its operation. A unique random or pseudo-random set of initial phase differences for the adjacent harmonic pairs is used to encode each character of transmitted data, and these sets of initial phase differences are selected in such a way as to minimize crest factor of a total signal. When a fire-alarm sensor is actuated, it is sufficient to transmit only one symbol to an alarm panel which, unambiguously identifies the location of the active sensor and as a rule is embodied in the form of a conventional number or address pre-allocated to the sensor.

11 Claims, 2 Drawing Sheets

METHOD OF GEOMETRIC HARMONIC SIGNAL MODULATION

FIELD OF THE INVENTION

The present invention relates to data collection and alternate current (ac) supply network signalling and can be used for low-speed data acquisition from remote sensors of intrusion protection and fire alarm systems as well as from electric, water, heat, gas meters, etc.

DESCRIPTION OF THE RELATED ART

It is known a communication system over an ac supply network (U.S. Pat. No. 5,844,949, Int.Cl. H04B 001/10; H04L 025/08; H03D 001/04, issued Dec. 1, 1998) which involves a transmitter sending a signal with geometric harmonic modulation and a receiver for its reception and decoding. The main problem of the system in question is in the fact that it uses differential phase modulation (DPM) at each harmonic for the transmitted signal coding. This circumstance prevents information to be conveyed in energy-optimal way by small portions, for example one bit or one character at a time; because when DPM is utilized to transmit one bit or one character, it is necessary to send two signals at least, reference signal and intelligence one.

It is also known a communication system through ac network (U.S. Pat. No. 6,329,905, Int.Cl. H04M 011/04, issued Mar. 23, 2000) with a transmitter sending a signal which comprises two harmonics with DPM, frequencies of the indicated harmonics being one half multiple of the network voltage reference frequency. The main problem of this system is its known low noise stability connected with the fact that for data transmission it uses a signal with energy concentrated only within two narrow regions so that the presence of repeatable interference at a frequency accidentally coinciding with one transmission frequency will make such a system completely inoperative. Besides, since the frequencies of the indicated harmonics differ essentially (by multiples of two and more), their differential phases at the reception point will fluctuate greatly and by random, simultaneously with phase-frequency characteristic fluctuations of the signal-propagation medium, what will make signal decoding at the reception point impossible.

DESCRIPTION OF THE INVENTION

The object of the present invention is to provide a method of signal modulation oriented to data transmission by small portions (for example, by one bit) at large intervals, more energy-optimal than now known ones, which would provide data collection from numerous low-speed sensors coupled to the ac power network, for example sensors of intrusion protection and fire alarm systems, under most unfavourable conditions and in the presence of strong signal attenuation.

The indicated technical result when the present invention is realized is achieved, in contrast to other known methods, by using as a modulation object a phase difference of signal adjacent harmonic components what, as compared to conventional DPM, makes it possible to reduce intelligence signal time by half with complete retention of the noise stability. Note that the indicated advantage will take place exclusively in transmission of small data portions, such as one bit or, in more general interpretation, one character at a time. In many practical cases it appears to be quite sufficient; thus, for example, when a fire alarm sensor comes into action, it will suffice to transmit to the alarm prevention terminal only one character uniquely identifying the location of the actuated sensor (such character, as a rule, is either a conditional number or agreed address assigned to the sensor in question in advance).

Analysis of the engineering level carried out by the applicant, which involved an information search in patent, scientific and technical literature, in an attempt to reveal the sources containing information on the present invention, ascertains that the applicant has discovered no analogue with features identical to these of the present invention. So selection from the list of found analogues of the prototype as the closest by combination of features analogue has made it possible to reveal a set of important, with respect to the technical result expected by the applicant, distinguishing features in the claimed object stated in claims. To verify whether the present invention comply with the requirements of the inventor's level, an additional search for known features coinciding with distinguishing features in the claimed prototype has been carried out. Its results show that the present invention for those skilled in the related art does not follow directly from the known engineering level because designs, wherein phase differences of numerous adjacent harmonic components are used for signal modulation, are not known.

BRIEF DESCRIPTION OF THE DRAWINGS

The claimed method of geometric harmonic signal modulation is clarified by the drawings.

DESCRIPTION OF THE PREFERRED EMBODIMENTS

Figure 1:
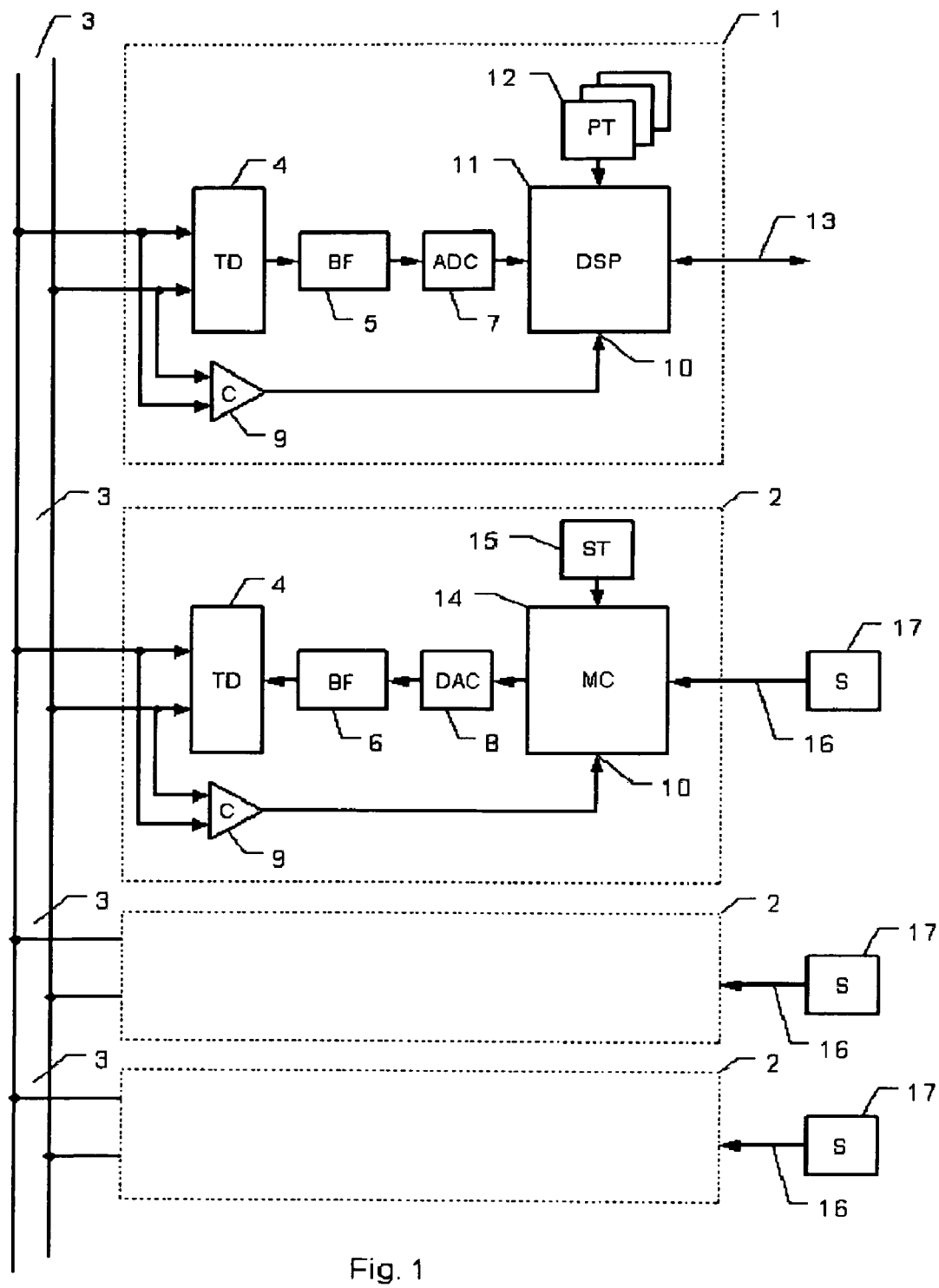
FIG. 1 is a block diagram of a system for data collection through ac network from numerous fire alarm sensors wherein the present method of modulation is used.

An embodiment of the present invention is described with respect to a system of data collection from fire alarm sensors (FIG. 1) which comprises one main unit 1 and several slave units 2. All system units are electrically coupled to the same segment of power network 3. The internal structure of main unit is very similar to that of slave units and it includes the following elements: protection and signal tracking device 4, band-pass filters 5 and 6, analog-digital converter (ADC) 7, digital-analog converter (DAC) 8, comparator with hysteresis 9, interrupt input 10. The distinction is in the fact that the system main unit is based on powerful digital signal processor 11 and phase tables 12, digital signal processor 11 having communication channel 13 with the outer world, whereas a simpler and cheaper slave unit is totally based on general-purpose microcontroller 14 and signal table 15, a primary fire alarm sensor, for example a smoke detector, being connected to microcontroller 14 via communication line 16. The system operating frequency range is 20 . . . 95 kHz. A signal from a slave unit is transmitted within this range at 96 harmonics being evenly spaced, exactly at 781.25 Hz.

Figure 2:
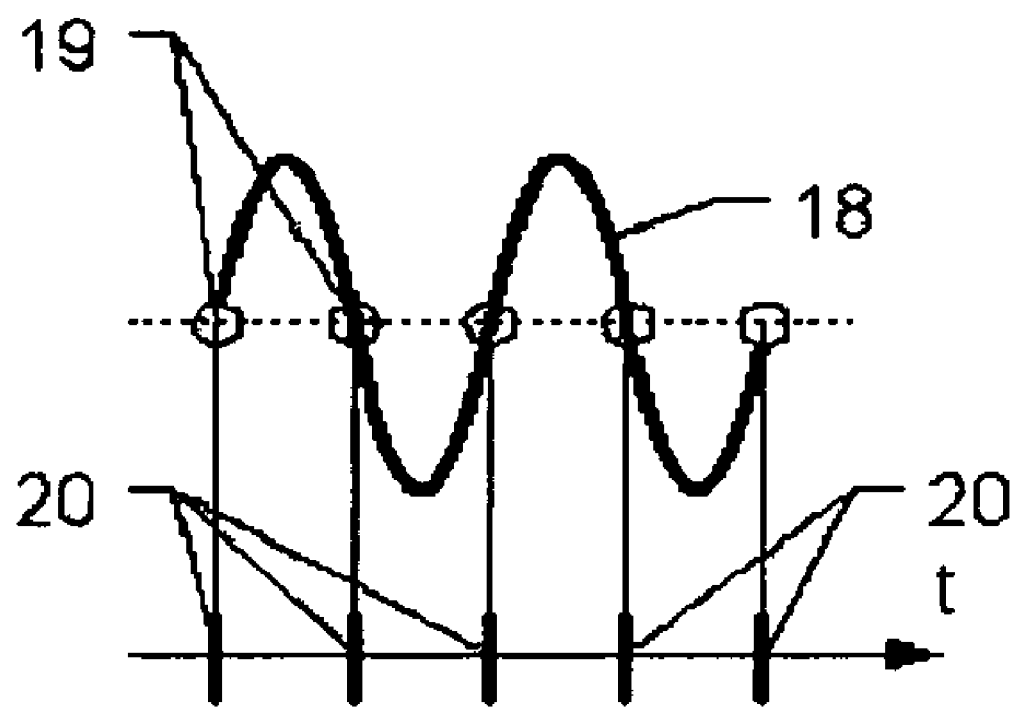
FIG. 2 is a diagram showing the principle of how to create time marks for primary (bit) synchronization.

The data collection system operates in the following manner (FIGS. 1, 2). Comparators 9 pick out the moments when network voltage 18 becomes equal to zero 19, thus forming a sequence of time marks 20, practically synchronous for the whole system, which is used for primary (character) synchronization for data transmission from slave units to the main one. On operation of primary sensor 17 microcontroller 14 begins to play back periodically through DAC 8 its signal table which is stored in a permanent memory and is unique for each slave unit 2. The signal table playback time is equal exactly to one half-cycle of network voltage and the playback starting point is defined by the instant of comparator 9 operation which takes place when the network voltage in line 3 is equal to zero. A signal from DAC 8 output is further filtered by band-pass filter 6 to remove the out-of-band components and through protection and signal tracking device 4 is delivered to network line 3. Signal table 15 is unique for each slave unit 2. A set of signal tables has been synthesized before the network for data collection according to the present method is developed. A candidate-set of 96 numbers $\phi_k$ from the interval $[0 \ldots 2\pi]$ is generated by a random-number or pseudorandom number generator. This set is further used to synthesize a signal of the type $$s(t)=\Sigma \sin(2\pi \cdot f_m \cdot t + \phi_m) \text{ where}$$

$m=0 \ldots 95$, $f_m$—96 harmonics evenly spaced at interval of 781.25 Hz within the system operating frequency band $(20 \ldots 95 \text{ kHz})$. Signals s(t) with a good value of the crest factor and their phase sets are stored in table form for further use. As practice shows, the probability is rather high that a signal to be synthesized from a given random set of 96 phase differences will have the crest factor being only 4 dB worse than the crest factor of pure sine wave. A signal from a slave unit transmitter passes through a segment of power network 3 where noise is added to it. The signal is then attenuated, subjected to different kind of linear and nonlinear distortion and enters network main unit 1 where it passes through tracking device 4, band-pass filter 5 and is converted to digital form in ADC 6. Digital signal processor 13 stores all AFC samples of the given bit interval and performs a Fourier transform on them. This results in a set of complex Fourier coefficients but only those 96 coefficients with frequencies fitting those on which a slave unit transmits its data are used further. In what follows denote them by $C_m$, where $m=0 \ldots 95$. At the next stage the following products are found:

$$D_k = C_k \cdot (C_{k-1})^* \cdot \exp(-j \cdot \Delta\phi_k), \text{ where}$$

$\Delta\phi_k = \phi_k - \phi_{k-1}$, $\phi_m$—a corresponding phase set taken from phase tables 12 which was used to generate a signal table for a given slave unit, $k=1 \ldots 95$, $m=0 \ldots 95$, asterisk denotes complex conjugation. Then for each slave unit an estimate as the following sum is calculated:

$$S = \Sigma \text{sign}\{Re(D_k)\}.$$

These operations imply that products $C_k \cdot (C_{k-1})^*$ are complex vectors with rotation angles being equal to phase differences of adjacent harmonics in the received signal, $D_k$ values are the same vectors rotated to the real axis through an angle exactly opposite to the angle used for modulation of these harmonics in a slave unit transmitter. Thus, if a "correct" signal from a slave unit is found in a given bit interval, its corresponding set of complex values $D_k$ is being concentrated along the real axis and the sum S will show a greater positive shift. If a given bit interval has no "correct" signal from a slave unit, the value S, as can be easily seen, will be a normally distributed random quantity with zero mean and standard deviation of about 10. Determination of the signal from a given slave unit is completed by comparing the sum S with some predetermined and sufficiently large threshold.

Compared to known methods of geometric modulation the described signal has an effective duration reduced by one half, what allows power consumption of a slave unit to be reduced likewise with simultaneous retention of all noise stability characteristics of the system.

INDUSTRIAL APPLICABILITY the above information therefore testifies that the following set of conditions is: fulfilled with electric network communications and more particularly in systems of data collection from remote sensors;

a possibility of realization of the present invention, as it is characterized in claims, is confirmed by means and methods either cited above or already known before the priority date of the application;

a means embodying the present invention is capable, when realized, of providing the technical result expected by the applicant.

What is claimed is:

1. A method of transmitting at least one digital code over a network carrying AC current comprising:

transmitting a signal corresponding to the code over the AC current network using the AC current for determining timing of transmission, wherein, for each code, the signal is a sum of sine waves of several frequencies with phases selected between 0 and $2\pi$ for each frequency, wherein the same frequencies are used for all codes, and wherein the set of phases is unique for each code.

2. The method of claim 1, wherein the signal for at least one code is transmitted from storage.

3. The method of claim 1, wherein the phases are selected to minimize the crest factor of the signal.

4. The method of claim 1, wherein the phases are selected randomly or pseudo-randomly between 0 and $2\pi$.

5. The method of claim 1, wherein the frequencies are equidistant.

6. The method of claim 1, wherein the at least one digital code identifies a transmitting device.

7. A method of detecting transmission at least one digital code over a network carrying AC current comprising:

for each code, determining a phase $\phi_i$ between 0 and $2\pi$ for each of several frequencies $f_i$ so that the set of phases is unique for each code;

receiving a signal over the AC current network using the AC current for determining timing of transmission;

for each frequency $f_i$ determining a complex Fourier coefficient of the signal $C_i$;

calculating a sum by adding for each pair $(i, i-1)$ $$\text{sign}(Re(C_i(C_{i-1})^* \cdot \exp(-j \cdot (\phi_i - \phi_{i-1})))); \text{ and}$$

detecting the digital code when the sum is higher than a threshold.

8. The method of claim 7, wherein the phases are selected to minimize the crest factor of the signal.

9. The method of claim 7, wherein the phases are selected randomly or pseudo-randomly between 0 and $2\pi$.

10. The method of claim 7, wherein the frequencies are equidistant.

11. The method of claim 7, wherein the at least one digital code identifies a transmitting device.

* * * * *